US005293015A

United States Patent [19]

Yuda

[11] Patent Number: 5,293,015

[45] Date of Patent: Mar. 8, 1994

[54] APPARATUS FOR ADJUSTABLY POSITIONING SWITCHES

[76] Inventor: Lawrence F. Yuda, P.O. Box 499, Westminster, S.C. 29693

[21] Appl. No.: 951,761

[22] Filed: Sep. 28, 1992

[51] Int. Cl.$^5$ .............................................. F16M 13/00

[52] U.S. Cl. .................................... 200/294; 248/500; 335/202

[58] Field of Search ....................... 200/293, 294, 296; 248/500, 506; 335/202; 338/315, 317; 361/417, 419, 420, 331

[56] References Cited

U.S. PATENT DOCUMENTS 4,352,476 10/1982 Meeks ................................ 248/74.1

4,903,933 2/1990 Yuda .................................. 248/500

4,916,265 4/1990 Luallen ........................... 200/294 X

*Primary Examiner*—Renee S. Luebke

*Attorney, Agent, or Firm*—Ralph Bailey

[57] ABSTRACT

Apparatus is illustrated for positioning longitudinally spaced switches upon a base member which member may be the cylinder of a robotic control apparatus and which apparatus achieves a clamping action through the use of a rail (A), a locking bracket (B), a rocker arm (C) fixed upon the rail and an abutment (D) carrying a bearing member (E) forcing the bracket into engagement clamping both sides of the switch against the base member.

3 Claims, 1 Drawing Sheet

APPARATUS FOR ADJUSTABLY POSITIONING SWITCHES

BACKGROUND OF THE INVENTION

This is an improvement upon the clamping apparatus of U.S. Pat. No. 4,903,933.

Apparatus for positioning switches in longitudinal alignment for adjustment as to longitudinal spacing as when sensing the positioning of a magnetic field, such as illustrated in the robotic control apparatus of U.S. Pat. No. 4,723,503, presents difficulties in holding down a plurality of spaced switches in adjustable positions. Switching apparatus of the type which may be used in the control apparatus of the patent has included a channel shaped rail having an edge carried by one of the legs for engaging a longitudinal groove in the switches. By fastening the rail down with spaced screws with the legs or flanges extending downwardly toward the cylinder confining the switches, adjustment may be achieved through loosening of the screws, but such a construction has resulted in the switches inadvertently becoming loose while the device is in operation. Other apparatus has been relatively complex and bulky making it difficult to utilize a robotic control apparatus in confined spaces. The apparatus of the invention is also useful in other applications where it is desired to positively adjustably position a plurality of longitudinally spaced switches.

Accordingly, it is an important object of this invention to provide a clamping apparatus for adjustably positioning switches such as upon a cylinder of a robotic control apparatus where the switches are to sense the presence of magnetic fields in order to actuate a robotic action.

Another important object of the invention is to positively adjustably position switches obtaining an improved clamping action through the use of a fulcrum and locking bracket so as to prevent rattling and inadvertent displacement of the switches.

Still another important object of the invention is to provide apparatus for adjustably positioning switches which may be inexpensively constructed of plastic without being subject to excessive fatigue from repeated use.

SUMMARY OF THE INVENTION

Apparatus has been provided for the positive positioning of longitudinally adjustable switches through the use of a simplified structure employing a longitudinal rail together with a locking bracket extending over respective switches for engagement by a fulcrum carried by the rail wherein a member is provided for exerting a force between a free end of the locking bracket and the switch causing the locking bracket to bear against the fulcrum resulting in a positive clamping action adjacent opposite sides of the switches in respect of a base member carried by the switches.

The embodiment of such an apparatus illustrated in U.S. Pat. No. 4,903,933 possesses the disadvantage of utilizing a locking bracket having an elongated span which is flexed in use so as to be subject to excessive fatigue resulting in breakage.

It has been found that this disadvantage may be avoided by substituting an upstanding abutment on the locking bracket carrying a bearing member forcing the locking bracket into engagement clamp in the switch on each side in the combination.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
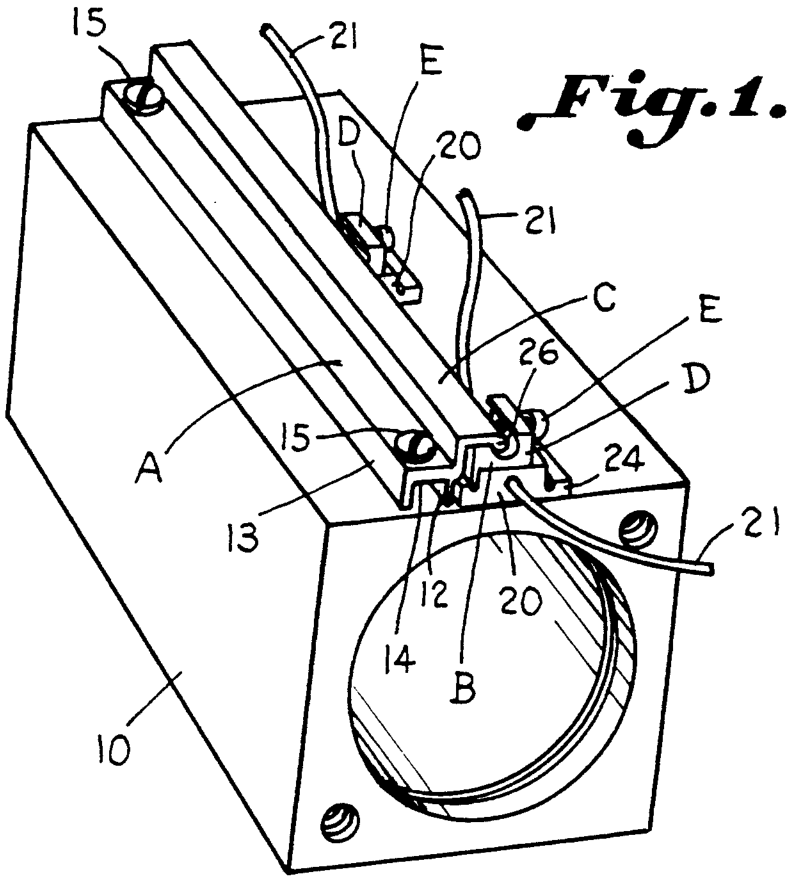
FIG. 1 is a perspective view illustrating apparatus for positioning longitudinally adjustable switches upon a cylinder constructed in accordance with the present invention.

The drawing illustrates apparatus for positioning a switch upon a base member. An elongated longitudinally extending rail A with which the switch is aligned is positionable in fixed relation upon the base member. A locking bracket B extends transversely over and engages the switch adjacent one side thereof adjacent the rail. A transversely extending rocker arm C is fixed upon the rail for extending over the locking bracket for exerting a force against an intermediate portion of the locking bracket. An abutment D extends upwardly and is carried by the locking bracket. A bearing member E is carried by the upstanding abutment forcing the locking bracket into such engagement with said switch on the one side adjacent the rail as at 19 and on the opposite side of said switch. Thus, the locking bracket clamps the one side of the switch against the base member responsive to said rocker arm exerting said force and clamps the other side of the switch against the base member responsive to the bearing member forcing the locking bracket into such engagement. Preferably the bearing member is a screw threadably carried and sloped upwardly into engagement with the rocker arm. The rocker arm has a depending edge engaged by said bearing member, and the locking bracket has a ridge for bearing against said depending edge.

Referring more particularly to the drawings, apparatus for positioning the longitudinally adjustable switches is illustrated as being positioned upon a base member 10 having a cylindrical hollow which may be of the type illustrated in U.S. Pat. No. 4,723,503.

Figure 2:
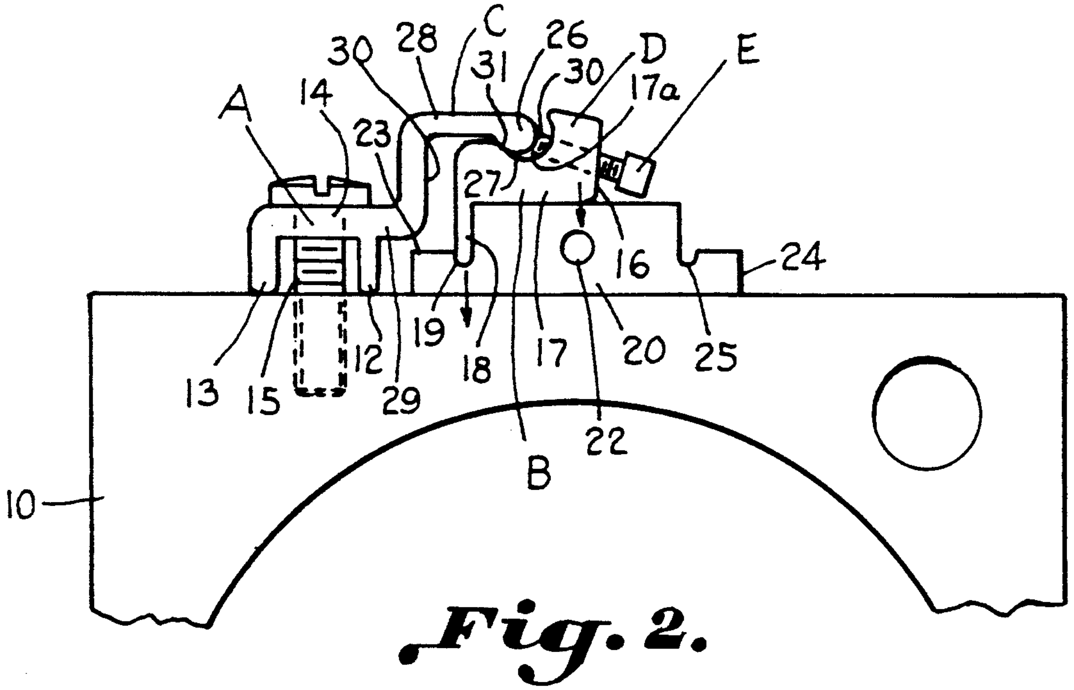
FIG. 2 is an end elevation further illustrating the apparatus for positioning the longitudinally adjustable switches upon the cylinder.

The elongated longitudinally extending rail A is illustrated as including a channel shaped member having flanges 12 and 13 bridged by a web member 14. The rail is illustrated as being secured to the base member 10 on one side thereof as by spaced screws 15 which are threadably received within the base member 10. The locking bracket B which is illustrated as extending transversely over and engaging the switch includes an end portion 16 (FIG. 2). The locking bracket B has a base 17 connecting the end portion 16 with an inwardly extending flat flange portion 18 which is received within longitudinal groove 19 carried within the switch 20 as by a pressed fit.

The switches 20 are illustrated as being Hall Effect Switches and suitable electrical leads are illustrated at 21 (FIG. 1) extending from a central portion 22 of the switches. The electrical switches 20 ar further illustrated in FIGS. 2 as including marginal ear portions 23 and 24 which are defined by longitudinal grooves 19 and 25 in marginal portions of the switch. When the transversely extending relatively short, rocker arm C is separate from the locking bracket, it includes a fulcrum in the form of an enlarged depending edge 26 at a free end thereof having an arcuate bearing portion 27 for reception with a complimentary groove which is illustrated as being arcuate at 17*a*within the base member 17.

An arm 28 connects the fulcrum 26 to a flange 29 which extends integrally from the rail A for connection by a web member 30*a*.

The rail A, the locking bracket B and the transversely extending rocker arm C, the components of which are described above, may be formed by extruded plastic.

The upstanding abutment D is integral with the locking bracket B remote from the rail A. The bearing member E includes a screw having a threaded shank 30 which is carried by an internally threaded portion of the upstanding abutment D and is inclined from the free edge 16 of the locking bracket B upwardly toward the fulcrum 26.

Thus the locking bracket B clamps one side of the switches 20 against the base member 10 and the opposite side of the switch against the base member as well. It will be noted that the rocker arm C has a large depending edge which forms the fulcrum 26 and that the locking bracket has a ridge 31 formed by the arcuate or U-shaped groove 17*a*.

The urging of the fulcrum against the ridge 26 causes the flanged portion 18 of the locking bracket to exert a downward component as illustrated by the adjacent arrow while the bearing of the shank 30 against the fulcrum produces a downward component causing the opposite side of the switch to bear against the base member as illustrated by the arrow adjacent the free edge 16 overcoming any forces tending to exert an upward reaction against the switch remote from the flanged portion 18.

It is thus seen that an improved apparatus for adjustably positioning switches in longitudinal alignment upon a base member has been provided.

Structures constructed in accordance with the invention are not subject to fatigue resulting in prolonged useful life and are sufficiently rugged to ensure dependable operation over extended periods of time.

While a preferred embodiment of the invention has been described using specific terms, such description is for illustrative purposes only, and it is to be understood that changes and variations may be made without departing from the spirit or scope of the following claims.

What is claimed is:

1. Apparatus for positioning a switch upon a base member comprising:

an elongated longitudinally extending rail, with which said switch is aligned, positionable in fixed relation upon said base member;

a locking bracket extending transversely over and having a portion adjacent one edge engaging said switch adjacent one side thereof adjacent said rail;

a transversely extending rocker arm fixed upon said rail for extending over said locking bracket for exerting a force against an intermediate portion of said locking bracket;

said locking bracket being independent of and moveable longitudinally of said rocker arm;

an abutment extending upwardly from said locking bracket adjacent an edge opposite said one edge thereof; and a bearing member carried by said abutment, engaging said rocker arm and forcing said locking bracket downwardly into said engagement with said switch on said one side and on the other side of said switch;

whereby said locking bracket clamps said one side of said switch against said base member responsive to said rocker arm extending said force and clamps said other side of said switch against said base member responsive to said bearing member forcing said locking bracket into said engagement.

2. The structure set forth in claim 1 wherein said bearing member is a screw threadably carried by said abutment and sloped upwardly into engagement with said rocker arm.

3. The structure set forth in claim 2 wherein said rocker arm has a depending edge engaged by said bearing member, and said locking bracket has a ridge for bearing against said depending edge.

* * * * *